United States Patent [19]

Rocha et al.

[11] 4,111,076

[45] Sep. 5, 1978

[54] LIMITED ACCESS WIRE STRIPPER

[76] Inventors: James Rocha, 1108 Baywood, #152, Petaluma, Calif. 94952; L. Dean Carter, 825 Gold Ridge Rd., Sebastopol, Calif. 95472

[21] Appl. No.: 813,154

[22] Filed: Jul. 5, 1977

[51] Int. Cl.² .............................................. H02G 1/12
[52] U.S. Cl. .................................................. 81/9.5 A
[58] Field of Search .................. 81/9.5 R, 9.5 A, 9.51; 30/90.1

[56] References Cited

U.S. PATENT DOCUMENTS

| | | | |
|---|---|---|---|
| 2,724,985 | 11/1955 | Chamberlin | 81/9.5 A |
| 3,222,957 | 12/1965 | Kramer et al. | 81/9.51 |
| 3,707,099 | 12/1972 | Petz | 81/9.5 A |
| 3,763,723 | 10/1973 | Oprins | 81/9.5 A |
| 3,964,350 | 6/1976 | Casadio | 81/9.5 A |

*Primary Examiner*—James L. Jones, Jr.
*Assistant Examiner*—James G. Smith
*Attorney, Agent, or Firm*—Townsend and Townsend

[57] ABSTRACT

A wire stripping tool for removing insulation from the end of an insulated wire located in an area of limited access, comprising an elongate frame having wire clamping, opposed jaw members on one end thereof, an insulation cutting mechanism adjacent the jaw members, and a finger-operated actuator at the other end of the frame. The cutting mechanism, which includes a pair of opposed, relatively shiftable cutting blades, is movable along the frame between a first position adjacent the clamp apparatus to a second position spaced therefrom. Movement of the cutting mechanism from the first position causes the jaw members to be biased into clamping relation with an insulated wire inserted therein, clamping and holding the wire. As the cutting assembly continues to move toward the second position, engagement of one of the cutter blades with the inclined surface causes the blade to cut into and remove the insulation from the end of the wire.

8 Claims, 4 Drawing Figures

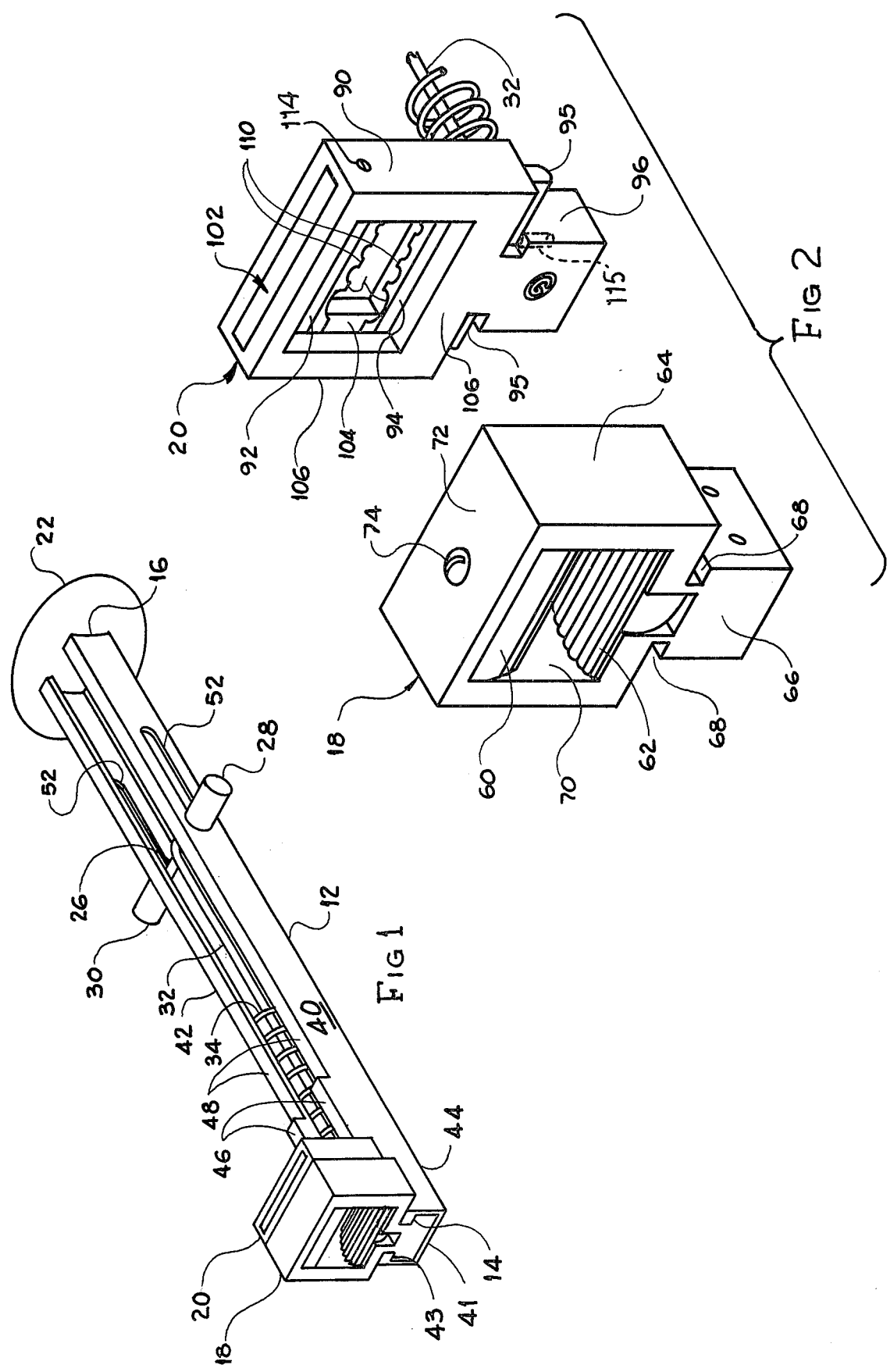

LIMITED ACCESS WIRE STRIPPER

This invention relates to a wire-stripping tool for removing insulation from the end of an insulated wire and more particularly to a wire stripper tool for removing insulation from a wire that is located in an area of limited access.

BACKGROUND OF THE INVENTION

Tools for removing the insulation from the end of an insulated wire are known. Known in the art as "wire strippers", such tools usually come in three basic constructions: Plier, scissor and pistol grip construction. To operate wire strippers of the plier or scissor variety, it is usually required that the stripper be oriented normal to the longitudinal of the wire from which insulation is to be removed. These wire stripper varieties often require the stripper to be pulled along the wire. If the wire is located in an area of limited access, such as under the dashboard of a car or in a T.V. chassis, proper operation of the tool can be extremely difficult. Further, wire strippers of this variety usually lack any type of apparatus for holding the wire. Thus, one must attempt to hold the wire with one hand while pulling the insulation off with the other; and, again, if the stripping operation is attempted in a work area of limited dimensions, removing the insulation can be a singularly frustrating experience.

The pistol grip wire stripper is an attempt to overcome the problems and deficiencies inherent in other types of wire strippers. This type of wire stripper normally separates the cutting and insulation removing apparatus from the actuating mechanism by some elongate element; the actuating mechanism is usually at right angles to the element. Clamping apparatus is usually provided adjacent the cutting mechanism. In use, this type of stripper allows the clamping and cutting end to be inserted into work areas of limited access so that an insulated wire may be clamped, the insulation cut and removed therefrom while the actuation of the tool remains outside the work area.

However, if the wire is located deep within the work area, so that actuation or operation of the tool must take place within that area, insulation removal again becomes difficult. Since the actuating handle is located generally perpendicular to the remainder of the tool, proper orientation, gripping of the wire, and operation, all within a confined area, can make use of this type of wire stripper just as difficult as the plier or scissor variety. Representative examples of the pistol grip variety are found in U.S. Pat. Nos. 3,707,099 and 3,763,723.

Thus, there is presently needed a tool that can remove insulation from the end of a wire that is located within an area of limited access which may also be actuated within a limited space and a minimum of required tool orientation.

It is therefore an object of the present invention to provide a wire stripper for removing the insulation from the ends of wires that are located in areas of limited access as well as being operable in such areas.

It is a further object to provide such a wire stripper that is relatively compact, simple and inexpensively manufactured, and easy to operate.

SUMMARY OF THE INVENTION

Therefore, in accordance with the teachings of the present invention, there is provided a wire stripper for removing insulation from the end of an insulated wire, the stripper comprising an elongate frame member having clamp apparatus on one end thereof, an insulation-cutting mechanism adjacent the clamp, and a finger-operated actuator at the other end.

The clamp apparatus includes a pair of opposed jaw members, each jaw member having a serrated clamping surface. One of the jaw members is pivotally mounted to the frame and engages a spring that biases the one jaw member toward and into clamping relation with the opposite jaw member. The one jaw member is held out of clamping relation with the other jaw member by engagement with the cutting mechanism, when in the first position proximate the clamp.

The cutting mechanism is movable along the frame between a first position adjacent the clamp apparatus to a second position spaced therefrom and includes a pair of opposed, relatively shiftable cutting blades. Cutting notches are formed in the opposed insulation-cutting edges of the blades for cutting into different diameter insulation without contacting the metallic portion of the wire. One of the blades movably engages an inclined surface of the frame so that as the cutting mechanism moves from the first position, one of the cutting blades engages the inclined surface causing the blade to be moved into insulation cutting relation with the other blade, thereby cutting into the insulation of a wire placed between the blades. Continued movement of the cutting apparatus pulls the insulation in a direction away from the clamp holding the wire and remaining insulation, thereby removing the end portion of insulation from the end of the wire.

Mounted at the other or actuating end of the frame is a smooth palm-engaging end cover and, proximate the end cover, an actuator bar with finger-receiving posts affixed to the ends.

The actuator bar is positioned transverse the frame and movably coupled thereto. Linkage operably connects the actuator bar to the cutting mechanism so that movement of the bar toward the end cover effects movement of the cutter from the first position, adjacent the clamp, toward the second position. The user places the palm-engaging end cover in the palm of his hand, and loops two fingers around the finger posts. Operation merely entails pulling the finger posts towards the palm of the hand which, in turn, causes movement of the cutter mechanism from the first position toward the second position. The insulation of a wire placed between the cutter blades is cut to a predetermined depth and separated, where cut, by continued movement of the cutter towards the second position.

As may now be seen, a number of advantages are achieved by the present invention over wire strippers presently used.

Positioning the clamp and cutting apparatus at one end of a frame — a location removed from any actuating elements of the tool — allows the user to gain access to the ends of wires in hard to reach areas and remove the insulation therefrom with relative ease. Moreover, the present invention possesses no handles or other extensions which protrude from the tool frame which can become entangled in wiring in the area and interfere with the operation of the tool. Operation of the entire tool in areas of limited access is possible, since operation merely requires movement of the actuator bar in a direction longitudinal to the frame member.

For a fuller understanding of the nature and advantage of the invention, reference should be had to the ensuing detailed description taken in conjunction with the accompanying drawings.

BRIEF DESCRIPTION OF THE DRAWINGS

FIG. 1 is a perspective view illustrating the limited access wire stripper of the present invention;

FIG. 2 is a perspective view of the clamp apparatus and cutting mechanism of the present invention;

DETAILED DESCRIPTION OF THE INVENTION

Figure 3:
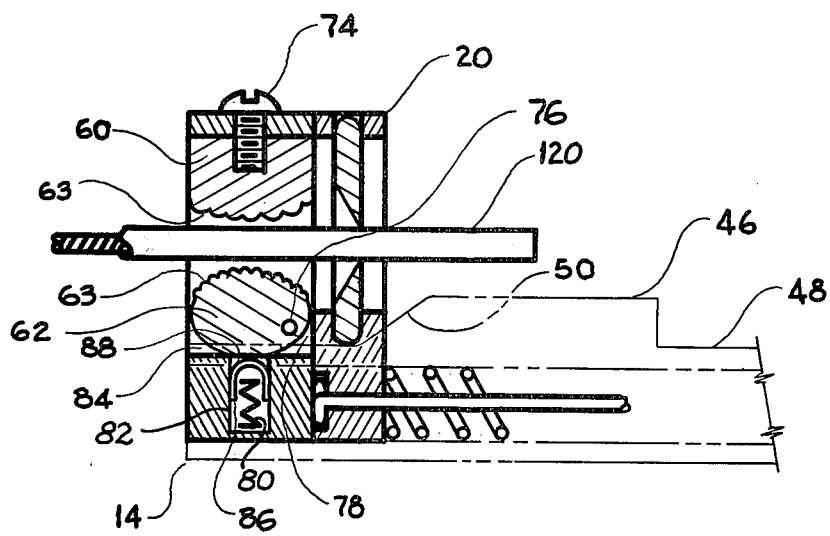
FIGS. 3 and 4 are partial side sectional views of the wire stripper of the present invention illustrating operation of the clamping and cutting functions performed by the present invention.

Turning now to the drawings, FIG. 1 illustrates the wire stripper of the present invention generally designated by reference numeral 10. The wire stripper 10 includes an elongate frame member 12 with clamp apparatus 18 mounted to end 14 of the frame with cutting mechanism 20 shown disposed adjacent to clamp 18. The other end 16 of the frame 12 has attached thereto a palm-engaging end cover.

Proximate end 16 of frame 12, and end cover 22, is actuator bar 26 with finger posts 28 and 30 attached to the opposing ends of the bar. Actuator bar 26 is connected to the cutting mechanism 20 by linkage 32 which is surrounded by helical spring 34.

Frame member 12 has a generally U-shaped cross-section formed by side walls 40 and 42 held in parallel, spaced relation by a bottom section 44. Opposed and inward extending flanges 41 and 43 are formed at the outer longitudinal margins of the side walls 40 and 42, respectively, which, as will be made more apparent by the discussion below, aid in keeping the cutting mechanism 20 in the track defined by the frame. A raised portion 46 is formed on the outer surface 48 of each side wall flange, near end 14 of the frame, having an inclined ramp 50 proximate the cutting mechanism 20 (shown in phantom in FIG. 3).

Formed in each side wall 40 and 42 of frame 12, and near end 16, are elongate slots 52, through which extend the ends of actuator bar 26. With the actuator bar so positioned, finger posts 28 and 30 are affixed, as by threading, press fitting or the like, thereby holding the actuator bar in the slots.

The clamp apparatus 18 includes a pair of opposed jaw members 60 and 62 mounted in a head portion 64 and a generally rectangular-shaped base 66. As can be seen, base 66 is formed with recess 68 separating the base and head portion to allow the base to be received and held by the U-shaped frame 12. The base is fixedly mounted to the frame by any appropriate fastening means.

Head portion 64 has formed therein a rectangular aperture 70 that extends in the direction of the longitudinal of frame 12. Jaw member 60 is removably mounted to the top portion 72 of the aperture 70 by a threaded bolt 74. Jaw member 62 is pivotally mounted within the rectangular aperture 70 of the head portion, in opposing relation to jaw member 60. Preferably, the clamping surfaces 63 of the jaw members are provided with serrations.

Jaw member 62 is provided with a somewhat elliptical cross-section. The pin 76, which pivotally mounts jaw member 62 to the head portion of the clamp apparatus, is positioned near the rear transverse edge 78 of the jaw member. The jaw member 62 is biased into clamping relation with jaw member 60 by helical spring 80, contained in a recess 82 located in the bottom portion 84 of the head portion. A cylindrical cap 86 having a rounded top 88 covers the spring 80 to reduce the frictional engagement between the spring and the jaw member and keep the spring situated within the recess 82.

The cutting mechanism 20 includes a rectangular blade holder 90, with cutter blades 92 and 94 mounted therein, and guide block 96. Recesses or channels 98 are positioned intermediate the frame and guide block to receive therein the flanges 41 and 43 of frame 12, as well as the raised portions 46 when the cutting mechanism 20 is positioned between the raised portions. The guide block is shaped so that it fits snugly within the U-shaped frame 12, yet is able to move therein with relative ease.

A blade-receiving passageway is vertically formed in the holder 90 by opening 102 and channels 104 formed in the interior surfaces of the uprights 106 of the frame. Channels 104 extend downward beyond the bottom cross member 106 of the frame and open into channels 98 to allow the outer ends of the bottom edge 95 of cutter blade 94 to be exposed, as illustrated in FIG. 2. This allows the edge 95 of cutter blade 94 to engage the upper surface 48 of frame 12 and, therefore, the raised portions 46 thereon, the purpose of which will be explained more fully below.

The insulation cutting edges 110 of cutter blades 92 and 94 are provided with notches 112 with similarly dimensioned notches situated in paired, opposing relation. Dimensions of the notches are dependent upon the wire diameter; that is, each pair of notches are sized so that they will cut through the insulation to form an annular ring about a metal wire of predetermined diameter without scoring or otherwise marking the metal.

Cutter blade 94 is inserted in frame 90 of cutting mechanism 20 through opening 102 so that the blade is slidably held in the blade frame by channels 104. Cutter blade 92 is then inserted into opening 102 of the blade frame 90 and removably secured thereto by fastening screws 114 or any other method of removable securement.

In order to ensure separation of cutter blades 92 and 94, prior to actuation, a small magnet 115 can be placed in guide block 96 and positioned proximate channels 98. Magnet 115 acts to attract and hold cutter blade 94 in a position spaced from cutter blade 92. It should be evident that use of a magnet to attract and hold cutter blade 94 requires the blade to be fabricated from a magnetic material. Alternately, a spring or like arrangement can be used to achieve the same result.

Cutter assembly 20 is fastened to actuator bar 26 by linkage 32. Wound about the linkage 32 is a helical spring 34 which biases the cutting mechanism to a position adjacent clamp apparatus 18. The end 35 of spring 34 is fastened to the frame 12 by any appropriate means (not shown).

Figure 4:
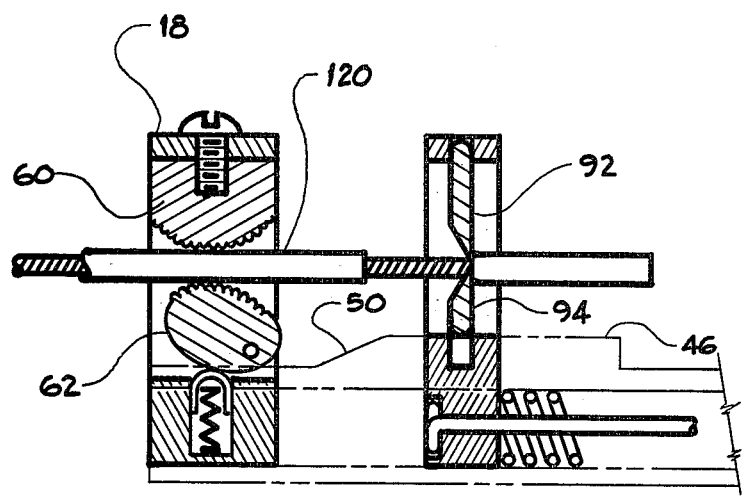

Referring now to FIGS. 1, 3 and 4, operation and use of the wire stripper 10 may now be described. FIGS. 1 and 3 illustrate the stripper 10 in its ready or insulated wire-receiving state. That is, cutter mechanism 20 is biased by spring 34 to a first position adjacent clamp apparatus 18, engages the rear edges 78 of jaw member 62. The bias force supplied by spring 34 is sufficient to cause jaw member 62 to pivot about pin 76 and against the counter-bias supplied by spring 82. The opposed jaw members 60, 62 are thereby placed in spaced-apart, wire-receiving relation. As long as the cutting mechanism remains in this first position, pivotal movement of jaw member 62 is inhibited. The user takes hold of the stripper 10 by placing the palm-engaging cover 22 in the palm of the hand and grasping finger posts 28 and 30. The stripper 10 accepts, head-on, a wire 120 through the normally spaced-apart jaw members 60 and 62 and cutter blades 92 and 94 and is aligned concentric with an appropriate notch pair 112 of the cutter blades.

The user then effects movement of the actuator bar 26 towards the palm of the user's hand to commence the stripping operation. Movement of the actuator bar 26 causes concomitant movement of cutter mechanism 20 from the first position, illustrated in FIG. 3, to the second position illustrated in FIG. 4. As movement from the first position is initiated, the inhibition against pivotal movement of jaw member 62 caused by cutter mechanism 20 is removed. Thus, jaw member 62 is biased toward jaw member 60 and into gripping relation with wire 120 therebetween.

As cutting mechanism 20 continues its journey from the first position, the lower edge 95 of cutter blade 94 engages the inclined ramp 50, which engagement causes the blade to move vertically toward and into cutting relation with cutter blade 92. Thus, the cutter blades are forced into the insulation surrounding wire 120, cutting the insulation at this point as blade assembly 20 approaches the second position.

At this point, it is advantageous to note two distinct aspects of the present invention. First, the direction of the serrations provided clamping surfaces 63 of each jaw member (e.g., forward or toward the wire) in conjunction with the manner in which jaw member 62 pivots (e.g., on pin 76 proximate the rear edge 78 of the jaw member) causes the clamping action to be enhanced by any pull exerted on wire 120 by cutting mechanism 20. Thus, after the blades of the cutter assembly have made their initial incision in the insulation of the wire and begin to pull the insulation apart at this incision, the pulling action will cause the jaw members to increase their clamping relation. A firm grip is thereby maintained, minimizing slippage of the wire between the jaw members and allowing the insulation to be separated.

Second, the wire stripper of the present invention uses both cutting and pulling actions to separate the insulation. The notches are, as mentioned above, appropriately dimensioned so that the cutter blades do not come into contact with the bare wire during cutting operation. That is, the cutter blades will close so that each notch will define an annular aperture that is greater than the diameter of the bare wire. The insulation covering the wire is cut and then, in effect, pulled apart where cut. During the stripping operation the wire from which the insulation is removed is not scored or otherwise damaged.

While the above provides a full and complete disclosure of the preferred embodiments of the invention, various modifications, alternate constructions and equivalents may be employed without departing from the spirit and scope of the invention. For example, the unique clamping and cutting operation disclosed herein can be employed, if desired, with a pistol-grip type of actuator and still achieve many of the advantages obtained by the present invention.

Therefore, the above description and illustrations should not be construed as limiting the scope of the invention, which is defined by the appended claims.

I claim:

1. Apparatus for removing insulation from an insulated wire, comprising:
    an elongate frame member having opposed ends and an inclined surface intermediate the ends;
    means on one end of the frame member for releasably clamping an end portion of the insulated wire;
    means for cutting into and for separating the insulation on the end portion of the wire movable on the frame member from a first position adjacent the clamping means to a second position spaced from the clamping means, the clamping means being held out of clamping relationship with the end portion of the insulated wire when the cutting means is in said first position, the cutting means including a pair of relatively shiftable cutter blades and a magnet for attracting and releasably holding at least one of the cutter blades away from the other of the cutter blades when the cutter means is in the first position, the one of the blades being engageable with and movable along the inclined surface whereby movement of the cutting means from the first position toward the second position causes the clamping means to engage and clamp the wire end portion and the cutter blades to be placed into insulation-cutting relationship;
    means for biasing the cutting means toward said first position; and
    means on the other end of the frame for moving the cutting means from the first position to the second position.

2. The apparatus of claim 1, wherein the moving means includes a finger actuator slidably mounted transverse the frame member.

3. The apparatus of claim 2, including a palm-engaging element mounted on the other end of the frame member, the element having an outer, generally smooth surface.

4. The apparatus of claim 1, wherein the cutting means is slidably mounted to the frame member for longitudinal movement therewith.

5. A wire stripper, comprising:
    an elongate frame member having opposed ends;
    a pair of opposed jaw members coupled to one end of the frame, at least one jaw member being pivotally mounted to the frame;
    first bias means mounted adjacent to and in operable contact with the pivotally attached jaw member adjacent the side margins for biasing said pivotally attached jaw member toward the other jaw member, a cutter assembly mounted to the frame between the ends thereof and being movable along the frame from a first position adjacent the jaw members to a second position away from the jaw members, the cutter assembly adapted to hold the pivotally attached jaw member in spaced, non-clamping relation relative to the other jaw member when in the first position, the cutter assembly including means for cutting into and separating insulation covering an end portion of the wire as the cutter assembly is moved from the first position to the second position; and
    means mounted to the other end of the frame for moving the cutter assembly from the first position to the second position so that as movement from the first position is initiated the one jaw member is biased toward the other jaw member and into clamping relation therewith while continued movement toward the second position causes the cutter assembly to cut and pull apart insulation about the wire.

6. The wire cutter of claim 5, wherein the bias means contacts the pivotally attached jaw member to pivot said pivotally attached jaw member to increase the clamping relation with the wire as the cutter assembly moves towards the second position.

7. The wire stripper of claim 6, including means to bias the cutter assembly toward the jaw members.

8. The wire cutter of claim 7, wherein the frame member includes means for defining side margins extending between the opposed ends and the movement means comprises:

an elongate actuator element mounted transverse and movable along the frame member, the actuator element having finger-receiving members attached to opposed ends thereof at the outer side margin of the frame member; and linkage connecting the actuator element to the cutter assembly.

* * * * *